United States Patent
Sato et al.

(10) Patent No.: US 6,898,356 B2
(45) Date of Patent: May 24, 2005

(54) SPLIT TYPE OPTICAL FIBER TAPE CORE

(75) Inventors: Toshihisa Sato, Yokohama (JP);
Tomoyuki Hattori, Yokohama (JP);
Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 22 days.

(21) Appl. No.: 10/432,168

(22) PCT Filed: Mar. 14, 2002

(86) PCT No.: PCT/JP02/02439

§ 371 (c)(1),
(2), (4) Date: May 20, 2003

(87) PCT Pub. No.: WO02/075419

PCT Pub. Date: Sep. 26, 2002

(65) Prior Publication Data

US 2004/0022512 A1 Feb. 5, 2004

(30) Foreign Application Priority Data

Mar. 15, 2001 (JP) ........................... 2001-074322
Mar. 15, 2001 (JP) ........................... 2001-074335

(51) Int. Cl.[7] ................................................. G02B 6/44
(52) U.S. Cl. ....................................................... 385/114
(58) Field of Search ................................. 385/100–114

(56) References Cited

U.S. PATENT DOCUMENTS 4,472,019 A 9/1984 Bishop et al.
4,608,409 A 8/1986 Coady et al.

FOREIGN PATENT DOCUMENTS

| EP | 843187 | 5/1998 |
|---|---|---|
| JP | 1-251005 | 10/1989 |
| JP | 4-310547 | 11/1992 |
| JP | 10-197767 | 7/1998 |
| JP | 11-092537 | 4/1999 |
| JP | 2000-231042 | 8/2000 |

*Primary Examiner*—Fayez G. Assaf
(74) *Attorney, Agent, or Firm*—McDermott Will & Emery LLP

(57) ABSTRACT

The separable optical fiber ribbon in accordance with the present invention is an optical fiber ribbon in which a plurality of colored optical fibers arranged in parallel are coated with a collective coating resin so as to be integrated into an optical fiber ribbon, and a plurality of such optical fiber ribbons are arranged in parallel and coated with a binding resin; wherein the binding resin is obtained by curing a UV-curable resin composition satisfying the condition represented by the following expression (1):

$$1.0 \times 10^{-4} \leq (W \cdot N / 100 M_W) \leq 4.0 \times 10^{-4} \qquad (1)$$

where W is the compounding ratio [wt %] of a urethane acrylate compound contained in the resin composition, N is the number of urethane groups in one molecule of the urethane acrylate compound, and $M_W$ is the average molecular weight of the urethane acrylate compound.

7 Claims, 4 Drawing Sheets

SPLIT TYPE OPTICAL FIBER TAPE CORE

TECHNICAL FIELD

The present invention relates to a separable optical fiber ribbon and a method of making the same.

BACKGROUND ART

Conventionally, separable optical fiber ribbons have widely been utilized in order to achieve higher density and easy handling in optical glass fibers (hereinafter referred to as optical fibers) used as an optical transmission medium. A separable optical fiber ribbon is one in which a plurality of colored optical fibers arranged in parallel are coated with a collective coating resin so as to yield an optical fiber ribbon, and a plurality of such optical fiber ribbons arranged in parallel are further coated with a binding resin so as to be integrated. The separable optical fiber ribbon can be divided into individual optical fiber ribbon by tearing the binding resin apart at a predetermined part.

For making the separable optical fiber ribbon having the above-mentioned configuration, a plurality of colored optical fibers arranged in parallel are initially transferred at a predetermined line speed to a coating unit and a curing unit in succession, while a thermosetting or UV-curable resin is applied thereto and cured, so as to form a collective coating resin, thereby yielding an optical fiber ribbon. Subsequently, a plurality of optical fiber ribbons are arranged in parallel and are coated with a thermosetting or UV-curable resin, which is then cured, so as to form a binding resin, whereby a separable optical fiber ribbon is obtained.

When tearing apart the binding resin in thus obtained separable optical fiber ribbon in order to divide the latter into individual optical fiber ribbons, the colored optical fibers may be exposed from the collective coating resin or drop out therefrom if the adhesion between the collective coating layer and the colored optical fibers is insufficient. If the binding resin expands too much, on the other hand, it may be hard to tear apart and divide.

For overcoming such phenomena, various studies have been conducted concerning physical properties of resins to be used, and various separable optical fiber ribbons have been proposed. For example, Japanese Patent Application Laid-Open No. HEI 10-197767 discloses a separable optical fiber ribbon whose physical properties such as the adhesion between the collective coating resin and binding resin, the Young's modulus and extensibility of the binding resin, and the like satisfy predetermined conditions, while stating that such a separable optical fiber ribbon can be divided into the individual optical fiber ribbons easily and reliably.

DISCLOSURE OF THE INVENTION

Meanwhile, demands for separable optical fiber ribbons have recently been increasing, thus making it desirable to develop mass-production techniques for separable optical fiber ribbons which can be divided into optical fiber ribbons easily and reliably. However, when the line speed of colored optical fibers or optical fiber ribbons transferred to the coating unit and curing unit is raised in the making step, it is not always easy to control physical properties of the binding resin and the like so as to make them satisfy predetermined conditions.

In view of the above-mentioned problems of the prior art, it is an object of the present invention to provide a separable optical fiber ribbon which can be divided into individual optical fiber ribbons easily and reliably, and a method of making the same.

The inventors conducted diligent studies in order to achieve the above-mentioned object and, as a result, have initially found that the concentration of urethane groups contained in the binding resin and the elongation of the binding resin have a very high correlation therebetween, such that the difference between the elongation at normal temperature and that at a low temperature can be made sufficiently large if the urethane group concentration is low, whereby the low-temperature elongation can be made sufficiently small if the urethane group concentration is controlled so as to satisfy a predetermined condition. As a result of further diligent studies based on such findings, it has been found that a separable optical fiber ribbon can be made easily and reliably if a resin composition whose urethane group concentration satisfies a predetermined condition is cured and used as a binding resin for a separable optical fiber ribbon, whereby the present invention is accomplished.

Namely, the separable optical fiber ribbon in accordance with the present invention is an optical fiber ribbon in which a plurality of colored optical fibers arranged in parallel are coated with a collective coating resin so as to be integrated into an optical fiber ribbon, and a plurality of such optical fiber ribbons are arranged in parallel and coated with a binding resin; wherein the binding resin is obtained by curing a UV-curable resin composition satisfying the condition represented by the following expression (1):

$$1.0 \times 10^{-4} \leq (W \cdot N / 100 M_W) \leq 4.0 \times 10^{-4} \tag{1}$$

where W is the compounding ratio [wt %] of a urethane acrylate compound contained in the resin composition, N is the number of urethane groups in one molecule of the urethane acrylate compound, and $M_W$ is the average molecular weight of the urethane acrylate compound.

By using the binding resin obtained by curing the UV-curable resin composition satisfying the condition represented by the above-mentioned expression (1), the present invention can control the elongation of the binding resin easily and reliably, thereby making it possible to obtain a separable optical fiber ribbon excellent in dividability easily and reliably.

Preferably, in the present invention, the binding resin has a tensile break elongation of 25% or less at 23° C.

Preferably, in the present invention, the binding resin has a tensile break elongation of 5% or less at −40° C.

Preferably, in the present invention, the collective coating resin is obtained by curing a UV-curable resin composition containing 0.5 to 0.9 wt % of 2-methyl-1-[4-(methylthio) phenyl]-2-morpholino-propane-1-on based on the total composition amount and 1.0 to 1.5 wt % of 2,4,6-trimethylbenzoyl diphenyl phosphine oxide based on the total composition amount.

The method of making a separable optical fiber ribbon in accordance with the present invention is a method of making a separable optical fiber ribbon in which a plurality of colored optical fibers arranged in parallel are coated with a collective coating resin so as to be integrated into an optical fiber ribbon, and a plurality of such optical fiber ribbons are arranged in parallel and coated with a binding resin; wherein the binding resin is obtained by curing a UV-curable resin composition satisfying the condition represented by the following expression (1):

$$1.0 \times 10^{-4} \leq (W \cdot N / 100 M_W) \leq 4.0 \times 10^{-4} \tag{1}$$

where W is the compounding ratio [wt %] of a urethane acrylate compound contained in the resin composition, N is the number of urethane groups in one molecule of the urethane acrylate compound, and $M_W$ is the average molecular weight of the urethane acrylate compound.

Preferably, in the making method of the present invention, the step of obtaining the separable optical fiber ribbon includes the steps of arranging a plurality of colored optical fibers in parallel, transferring the colored optical fibers to a coating unit and a curing unit in succession at a predetermined line speed, coating an outer periphery of a plurality of colored optical fibers with a UV-curable resin composition in the coating unit, and then curing the UV-curable resin composition in the curing unit so as to form a collective coating resin, whereas the UV-curable resin composition contains 0.5 to 0.9 wt % of 2-methyl-1-[4-(methylthio)phenyl]-2-morpholino-propane-1-on based on the total composition amount and 1.0 to 1.5 wt % of 2,4,6-trimethylbenzoyl diphenyl phosphine oxide based on the total composition amount.

Even when the line speed is 800 m/min or greater in the step of obtaining the separable optical fiber ribbon, there is no problem. In the conventional making methods, it has been quite difficult to cure collective coating resins sufficiently and uniformly under high line speed conditions. In the making method of the present invention, by contrast, the collective coating resin can be cured sufficiently and uniformly not only under low line speed conditions such as those of the conventional making methods but also under a high line speed condition of 800 m/min or greater, whereby the production efficiency of the separable optical fiber ribbon in accordance with the present invention can further be improved.

BEST MODES FOR CARRYING OUT THE INVENTION

Figure 1:
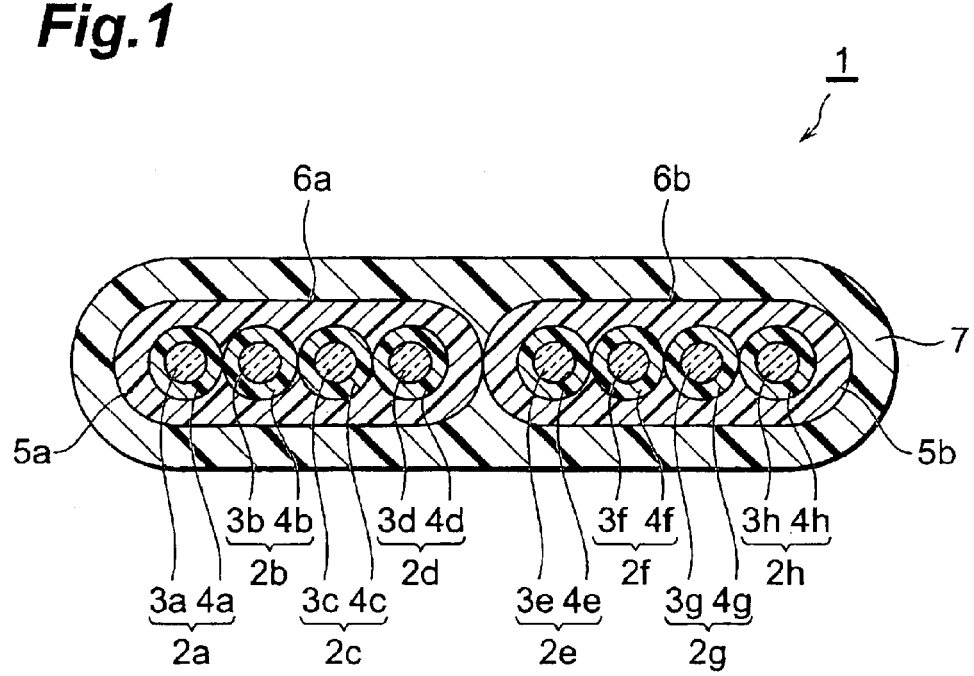
FIG. 1 is a schematic sectional view showing a preferred embodiment of the separable optical fiber ribbon in accordance with the present invention.

In the following, preferred embodiments of the present invention will be explained in detail with reference to the drawings when necessary. In the drawings, parts identical or equivalent to each other will be referred to with numerals identical to each other.

Figure 2:
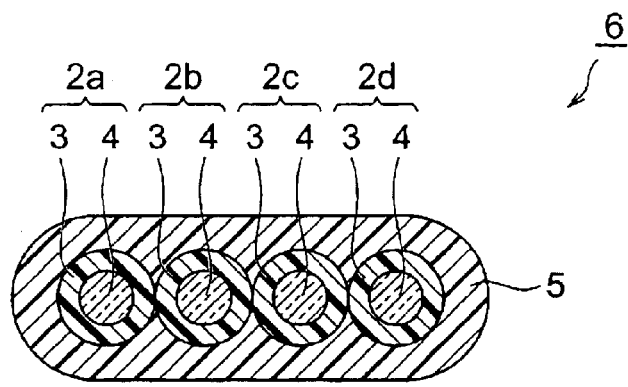
FIG. 2 is a schematic sectional view showing a preferred embodiment of the optical fiber ribbon in accordance with the present invention.

FIG. 1 is a schematic sectional view showing a preferred embodiment of the separable optical fiber ribbon in accordance with the present invention, whereas FIG. 2 is a schematic sectional view showing an example of a four-core optical fiber ribbon in accordance with the present invention. As depicted, eight colored optical fibers 2a to 2h are constituted by coated optical fibers 3a to 3h and coloring layers 4a to 4h disposed on their peripheral faces, respectively, and are arranged in parallel. The colored optical fibers 2a to 2d are coated with a collective coating resin 5a, whereas the coloed optical fibers 2e to 2h are coated with a collective coating resin 5b, whereby four-core optical fiber ribbons 6a, 6b are constructed, respectively. Further, the optical fiber ribbons 6a, 6b are coated with a binding resin 7 so as to be integrated, whereby a separable optical fiber ribbon 1 is constructed. The binding resin 7 is obtained by curing a specific UV-curable resin which will be explained in the following:

The binding resin 7 is obtained by curing a UV-curable resin composition satisfying the condition represented by the following expression (1):

$$1.0 \times 10^{-4} \leq (W \cdot N / 100 M_W) \leq 4.0 \times 10^{-4} \qquad (1)$$

where W is the compounding ratio [wt %] of a urethane acrylate compound contained in the resin composition, N is the number of urethane groups in one molecule of the urethane acrylate compound, and $M_W$ is the average molecular weight of the urethane acrylate compound. $W \cdot N/100M_W$ indicates the urethane group concentration in the UV-curable resin composition. If $W \cdot N/100M_W$ is less than $1.0 \times 10^{-4}$, the Young's modulus at a high temperature (e.g., 60° C.) becomes too low, whereby resin surfaces will be more likely to adhere to each other. If $W \cdot N/100M_W$ exceeds $4.0 \times 10^{-4}$, by contrast, the elongation of thus obtained binding resin becomes so large that the collective coating resin may break at the same time when the binding resin tears apart upon separating the individual optical fiber ribbons from each other, whereby the colored optical fibers may be exposed or drop off.

The binding resin in accordance with the present invention is not restricted in particular as long as it is obtained by curing a UV-curable resin satisfying the above-mentioned expression (1). For example, urethane acrylate resins, or composite resins combining urethane acrylate resins with epoxy acrylate resins, polyester acrylate resins, and the like can be used.

The UV-curable resin composition used in the present invention is not restricted in particular as long as it satisfies the above-mentioned expression (1). For example, it may be obtained by appropriately combining an oligomer selected from:

a urethane acrylate obtained by a reaction of bisphenol-A/ethylene-oxide-added diol, tolylene diisocyanate, and hydroxyethyl acrylate;

a urethane acrylate obtained by a reaction of polytetramethylene glycol, tolylene diisocyanate, and hydroxyethyl acrylate;

a urethane acrylate obtained by a reaction of tolylene diisocyanate and hydroxyethyl acrylate; and the like with a diluent monomer selected from:

tricyclodecane diacrylate;
N-vinyl pyrrolidone;
isobonyl acrylate;
bisphenol-A/ethylene-oxide-added diol diacrylate;
lauryl acrylate;
bisphenol A epoxy diacrylate;
ethylene-oxide-added nonyl phenol acrylate; and the like.

These constituents may be used separately or in combination of two or more. Also, these constituents may be used with polysiloxane compounds added thereto. When the UV-curable resin composition in accordance with the present invention contains at least two kinds of compounds having urethane groups, it is necessary that the average value of $W \cdot N/100M_W$ in at least two kinds of compounds having urethane groups satisfy the condition represented by the above-mentioned expression (1).

The UV-curable resin composition in accordance with the present invention is usually compounded with a photopolymerization initiator. Specific examples of such a photopolymerization initiator include 2-methyl-1-[4-(methylthio) phenyl]-2-morpholino-propane-1-on, 2,4,6-trimethylbenzoyldiphenyl phosphine oxide, 1-hydroxy cyclohexylphenyl ketone, and the like, among which 2-methyl-1-[4-(methylthio)phenyl]-2-morpholino-propane-1-on and 2,4,6-trimethylbenzoyldiphenyl phosphine oxide are preferred. The compounding amount of the photopolymerization initiator is preferably 0.1 to 5 wt % based on the total composition amount.

The tensile break elongation of the binding resin obtained by curing the UV-curable resin composition is preferably 25% or less, more preferably 10 to 25%, at 23° C. If the tensile break elongation of the binding resin at 23° C. exceeds 25%, the collective coating resin will be likely to break at the same time when the binding resin tears apart upon separating the individual optical fiber ribbons from each other, whereby the colored optical fibers may tend to be exposed or drop off.

Also, the tensile break elongation of the binding resin in accordance with the present invention is preferably 5% or less, more preferably 2 to 5%, at −40° C. If the tensile break elongation of the binding resin at −40° C. exceeds 5%, the collective coating resin will be likely to break at the same time when the binding resin tears apart upon separating the individual optical fiber ribbons from each other under a low temperature condition, whereby the colored optical fibers may tend to be exposed or drop off.

The tensile break elongation in the present invention refers to the elongation [%] obtained when a resin formed into a JIS No. 2 test piece defined in JIS K 7113 is pulled to break at a pulling rate of 50 mm/min.

The collective coating resin in the optical fiber ribbon coated with the binding resin is not restricted in particular, whereas its specific examples include UV-curable resins such as epoxy acrylate resins, urethane acrylate resins, and polyester acrylate resins, among which urethane acrylate resins are preferred. The constituents of the resin composition before curing these resins include those exemplified in the explanation of the above-mentioned binding resin.

While the collective coating resin in accordance with the present invention is usually obtained by curing a resin composition doped with a photopolymerization initiator, a UV-curable resin composition containing 0.5 to 0.9 wt % of 2-methyl-1-[4-(methylthio)phenyl]-2-morpholino-propane-1-on based on the total composition amount and 1.0 to 1.5 wt % of 2,4,6-trimethylbenzoyldiphenyl phosphine oxide based on the total composition amount is preferably used. Using such a UV-curable resin composition can fully cure both the surface (part distanced from the coloring layer of colored optical fibers) and deep part (part closer to the coloring layer) of the collective coating resin.

When colored optical fibers are transferred to a curing unit at a high line speed in a manufacturing step of conventional separable optical fiber ribbons, oxygen is likely to be entrained upon curing the collective coating resin, whereby the curing of the collective coating resin surface may tend to be insufficient. If the binding resin is subsequently applied thereto and cured, the adhesion between the collective coating resin and the binding resin may become too strong, thereby deteriorating the dividability (easiness of operation). If the curing of the collective coating resin is insufficient in the case where the outer peripheral face of the colored optical fibers is provided with a coloring layer, slipping may occur between the coloring layer and the collective coating resin upon removing the collective coating resin and its underlayers, since the adhesion to the coloring layer is weak, whereby glass may not be exposed, thus making it hard to remove them. Though various resin compositions have been proposed as materials for a collective coating resin in order to overcome these phenomena (Japanese Patent Application Laid-Open No. HEI 4-310547, Japanese Patent Application Laid-Open No. HEI 11-92537, etc.), the collective coating resin is hard to cure sufficiently and uniformly even when these resin compositions are used.

When a UV-curable resin composition containing 2-methyl-1-[4-(methylthio)phenyl]-2-morpholino-propane-1-on and 2,4,6-trimethylbenzoyldiphenyl phosphine oxide by the respective compounding amounts mentioned above is used as the collective coating resin in the separable optical fiber ribbon in accordance with the present invention, by contrast, the adhesion between the collective coating resin and the binding resin will not become so strong even if oxygen is entrained therebetween, whereby a separable optical fiber ribbon having an excellent dividability can reliably be obtained even under a high line speed condition (e.g., 800 m/min), which can improve the production efficiency.

Though the reason why the collective coating resin can be cured sufficiently and uniformly when 2-methyl-1-[4-(methylthio)phenyl]-2-morpholino-propane-1-on and 2,4,6-trimethylbenzoyldiphenyl phosphine oxide are used together in the present invention is unclear, the inventors presume as follows:

2-methyl-1-[4-(methylthio)phenyl]-2-morpholino-propane-1-on has the maximum absorption wavelength in the vicinity of 300 nm, whereas 2,4,6-trimethylbenzoyldiphenyl phosphine oxide has the maximum absorption wavelength in the vicinity of 380 nm. When compounds having respective maximum absorption wavelengths different from each other as such are used together, even if light having a specific wavelength is absorbed by one compound near the surface of the collective coating resin, light having a wavelength absorbable by the other compound can reach the collective coating layer, whereby each of the compounds seems to be able to function as a photopolymerization initiator without being affected by their mutual photopolymerization initiating effects. Also, since the molar extinction coefficient of 2,4,6-trimethylbenzoyldiphenyl phosphine oxide is lower than that of 2-methyl-1-[4-(methylthio)phenyl]-2-morpholino-propane-1-on, the improvement in curability of the collective coating resin surface seems to rely more on the photopolymerization initiating effect of 2-methyl-1-[4-(methylthio)phenyl]-2-morpholino-propane-1-on, whereas the improvement in curability of the deeper part of the collective coating resin surface seems to rely more on the photopolymerization initiating effect of 2,4,6-trimethylbenzoyldiphenyl phosphine oxide.

In the above-mentioned preferred UV-curable resin composition, the compounding amount of 2-methyl-1-[4-(methylthio)phenyl]-2-morpholino-propane-1-on is preferably 0.5 to 0.9 wt %, more preferably 0.6 to 0.8 wt %, based on the total composition amount as mentioned above. If the compounding amount of 2-methyl-1-[4-(methylthio) phenyl]-2-morpholino-propane-1-on is less than 0.5 wt %, the curability of the collective coating resin may deteriorate in particular, thereby increasing the adhesion between the collective coating resin and the binding resin in excess, which makes it difficult to tear the binding resin apart. Even if the compounding amount of 2-methyl-1-[4-(methylthio) phenyl]-2-morpholino-propane-1-on exceeds 0.9 wt %, on the other hand, the surface curability of the collective coating resin will not improve further, whereas it is not favorable in terms of reliability since the uncured components in the resin may increase due to the fact that a large quantity of light is absorbed in the vicinity of the collective coating resin, and so forth.

The compounding amount of 2,4,6-trimethylbenzoyldiphenyl phosphine oxide is preferably 1.0 to 1.5 wt %, more preferably 1.2 to 1.4 wt %, based on the total composition amount as mentioned above. If the compounding amount of 2,4,6-trimethylbenzoyldiphenyl phosphine oxide is less than 1.0 wt %, the curability of the deep part of the collective coating resin may deteriorate in particular, so that the adhesion between the collective coating resin and the coloring layer may increase, whereby a color peeling phenomenon tends to occur upon separating the colored optical fibers into individual cores by tearing and removing the collective coating layer. Even if the compounding amount of 2,4,6-trimethylbenzoyldiphenyl phosphine oxide exceeds 1.5 wt %, the curability of the resin will not improve further, whereas it is unfavorable in terms of reliability in that the amount of 2,4,6-trimethylbenzoyldiphenyl phosphine oxide remaining without contributing to curing increases, and so forth.

Thus, the separable optical fiber ribbon in accordance with the present invention has an excellent dividability, and can be obtained easily and reliably by the making method in accordance with the present invention.

Though FIG. 1 shows an example of separable optical fiber ribbon in which two optical fiber ribbons are coated with a binding resin, the number of optical fiber ribbons in the separable optical fiber ribbon in accordance with the present invention is not limited in particular and can be selected appropriately according to the use thereof.

Also, the number of colored optical fibers in the optical fiber ribbon is not limited in particular, and may be 2-core, 8-core, or 12-core according to the use.

Though the colored optical fibers $2a$ to $2h$ in FIG. 1 comprise the respective coloring layers $4a$ to $4h$, these coloring layers are provided as necessary. The coated optical fibers $3a$ to $3d$ and $3e$ to $3h$ may be coated four by four with collective coating resins $5a$, $5b$, respectively, so as to be integrated into optical fiber ribbons $6a$, $6b$.

The making method in accordance with the present invention will now be explained.

Figure 3:
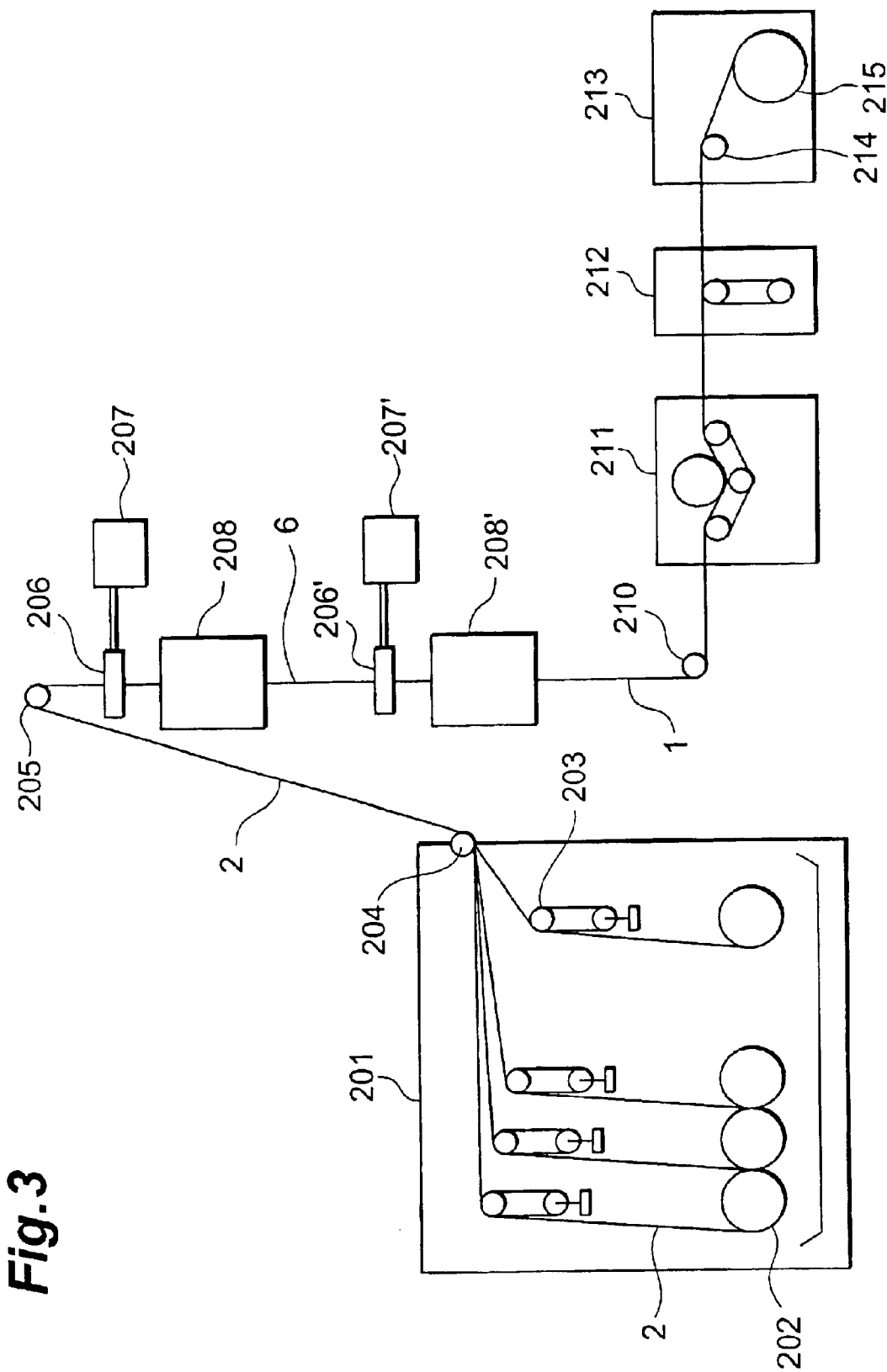
FIG. 3 is a schematic diagram showing an example of manufacturing apparatus favorably used in the present invention.

FIG. 3 is a schematic diagram showing an example of manufacturing apparatus favorably used in the making method of the present invention. First, in the apparatus shown in FIG. 3, a plurality of colored optical fibers 2 are transferred from a colored optical fiber feed supply 201 to a coating unit 206 by way of a line concentrator 205. Here, the supply 201 comprises a plurality of rotatable reels 202 for feeding wound colored optical fibers 2; dancer rollers 203 for applying a tension (usually about several tens of grams) to the colored optical fibers 2 transferred from the respective reels 202 so as to prevent them from sagging; and a guide roller 204, provided with the same number of grooves as that of the reels 202, for aligning the plurality of colored optical fibers with predetermined intervals and securing their transfer direction. Thus transferred plurality of colored optical fibers 2 are arranged in parallel so as to be perpendicular to the paper surface between the line concentrator 205 and the coating unit 206.

A pressurized tank 207 connected to the coating unit 206 contains a UV-curable resin composition, whereas the UV-curable resin composition is supplied from the pressurized tank 207 to the coating unit 206, so as to be applied to the colored optical fibers 2. Further, in a curing unit 208 disposed adjacent the coating unit 206, the UV-curable resin composition applied to the colored optical fibers 2 is irradiated with UV rays so as to be cured, thus forming a collective coating resin, whereby an optical fiber ribbon 6 is obtained. In the apparatus of FIG. 3, a plurality of optical fiber ribbons are obtained.

After the plurality of optical fiber ribbons 6 are arranged in parallel, a UV-curable resin composition satisfying the condition represented by the above-mentioned expression (1) is supplied from a tank 207' to a coating unit 206', whereas the optical fiber ribbons 6 are coated with the UV-curable resin composition in the coating unit 206'. In a curing unit 208', the UV-curable resin composition is cured, so as to form a binding resin, thereby yielding a separable optical fiber ribbon 1 of the present invention in which a plurality of optical fiber ribbons are integrated.

In the manufacturing step mentioned above, the line speed in the case where the colored optical fibers 2 are transferred to the curing unit 208 or the optical fiber ribbons 6 are transferred to the curing unit 208' is preferably at least 800 m/min from the viewpoint of productivity.

Preferably, the curing process in the curing units 208, 208' is carried out in an atmosphere with an oxygen concentration of zero or 1.0 vol % or less. While the adhesion of resin surfaces tends to improve as the oxygen concentration in the atmosphere increases, the curing of the collective coating resin or binding resin may become insufficient if the above-mentioned upper limit is exceeded, thereby increasing the adhesion between the resins in excess, by which the dividability tends to decrease.

Thus obtained separable optical fiber ribbon 1 travels a guide roller 210, a feed capstan 211, and a take-up tension dancer 212, so as to be taken up by a reel 215 in a take-up unit 213. The tension of the optical fiber ribbon 1 taken up by the reel 215 can be set to a desirable value by the take-up tension dancer 212, and is usually several tens to several hundreds of grams.

Figure 4:
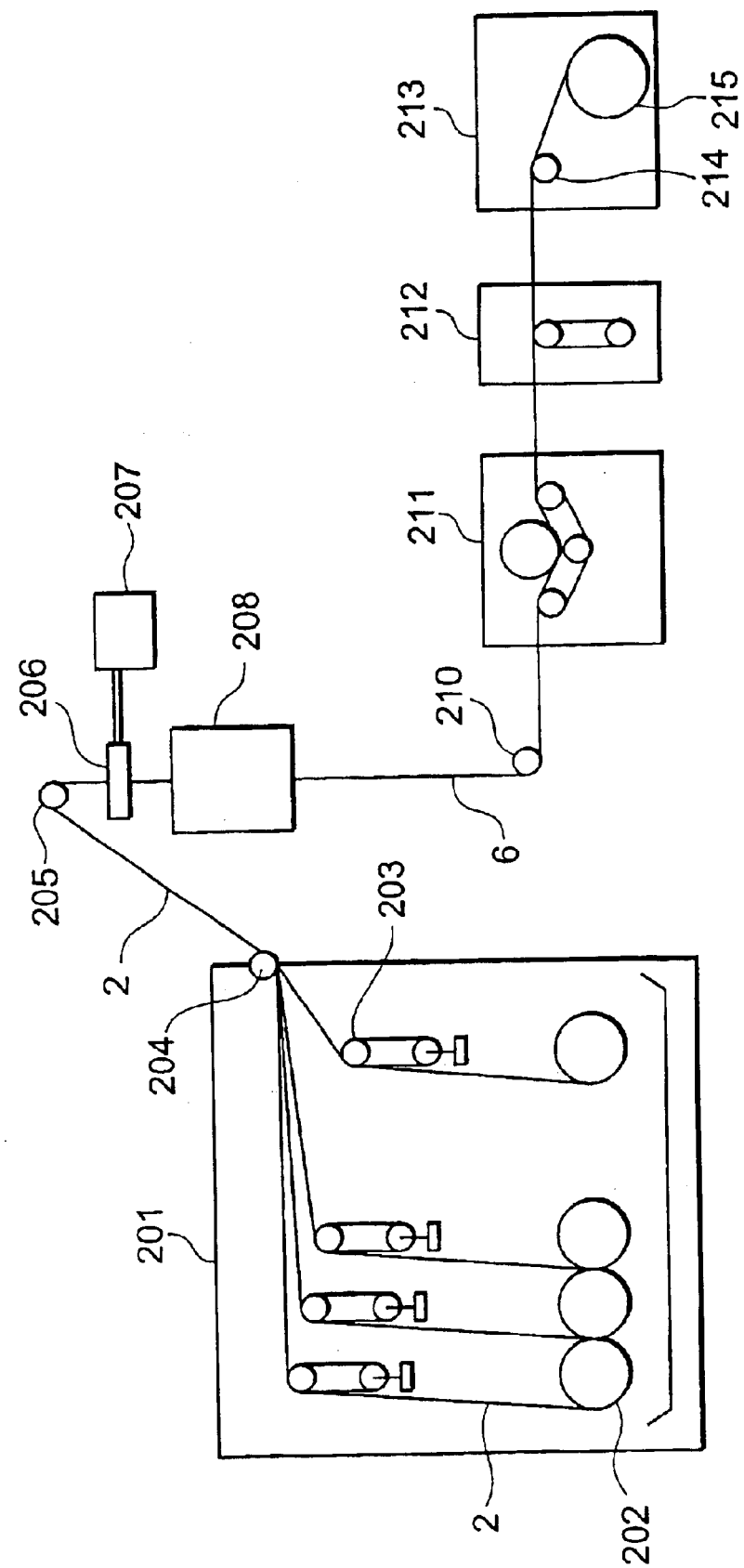
FIG. 4 is a schematic diagram showing another example of manufacturing apparatus used in the present invention.
Figure 5A:
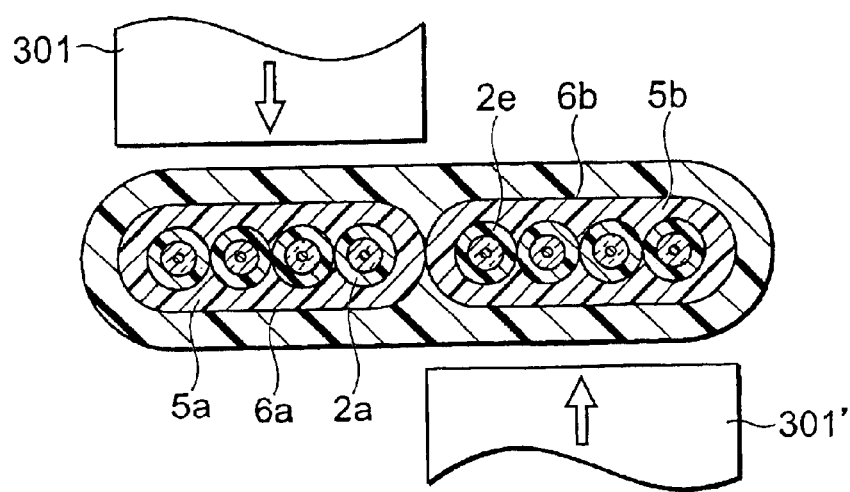
FIGS. 5A to 5D are explanatory views showing respective states in which a separable optical fiber ribbon is divided by using jigs.
Figure 5B:
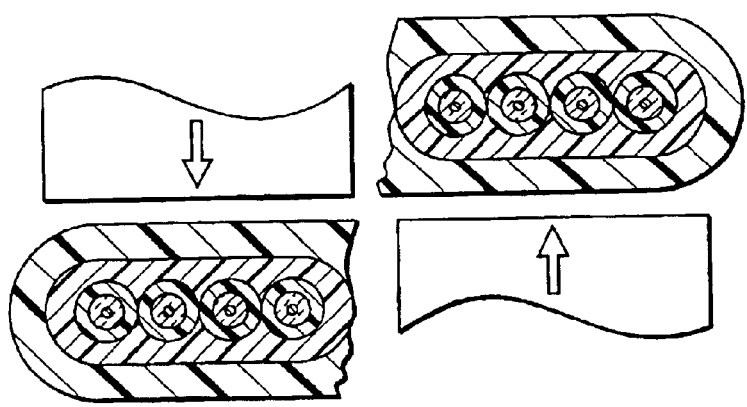
Figure 5C:
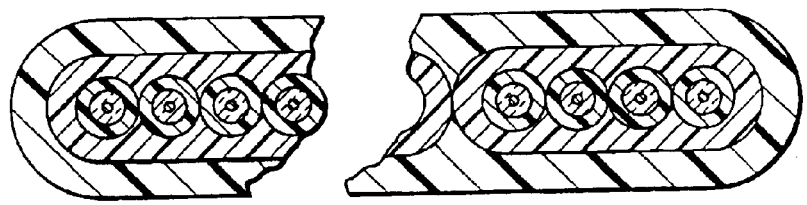
Figure 5D:
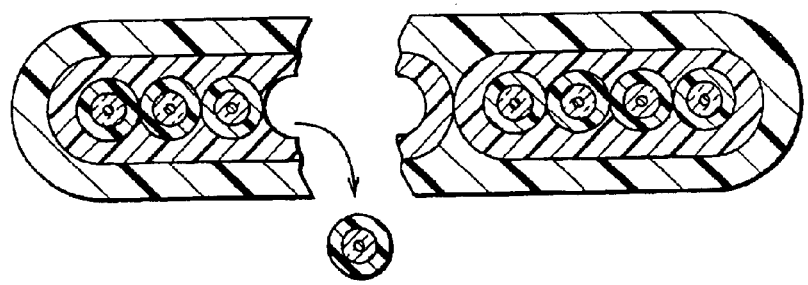

Though the manufacturing apparatus shown in FIG. 3 is favorably used when the step of forming a collective coating resin in the coating unit 206 and curing unit 208 and the forming of a binding resin in the coating unit 206' and curing unit 208' are carried out continuously, the optical fiber ribbons obtained after forming the collective coating resin may be once taken up by a reel, and then a plurality of optical fiber ribbons fed from the reel may be coated with a binding resin so as to be integrated into a separable optical fiber ribbon in the present invention. In the latter case, as shown in FIG. 4, a manufacturing apparatus having the same configuration as that of the manufacturing apparatus of FIG. 3 except that the coating unit 206 and curing unit 208 are provided one each and that the components on the downstream side of the guide roller 210 have dimensions suitable for the optical fiber ribbon may be used so as to make an optical fiber ribbon.

EXAMPLES

In the following, the present invention will be explained more specifically with reference to Examples and Comparative Examples, while the present invention is not restricted by the following Examples.

Example 1

Using the apparatus shown in FIG. 3, the separable optical fiber ribbon shown in FIG. 1 was made. In the following Examples, UV-curable resin compositions were cured under two conditions of a higher line speed condition (800 m/min) and a lower line speed condition (600 m/min)

(Colored Optical Fiber)

Used as a colored optical fiber was a color colored optical fiber (having an outer diameter of 255 μm) in which a single-mode glass fiber having an outer diameter of 125 μm was coated with a two-ply layer of a urethane acrylate resin and further coated with a urethane acrylate resin containing a colorant.

(Preparation of Optical Fiber Ribbon)

Four optical fiber ribbons, each of which was mentioned above, were arranged in parallel, and their outer peripheral face was coated with a UV-curable resin composition A comprising the following constituents:

18 parts by weight of a urethane acrylate obtained by a reaction of 1 mol of bisphenol-A/ethylene-oxide-added diol, 2 mol of tolylene diisocyanate, and 2 mol of hydroxyethyl acrylate;

30 parts by weight of a urethane acrylate obtained by a reaction of 1 mol of polytetramethylene glycol, 2 mol of tolylene diisocyanate, and 2 mol of hydroxyethyl acrylate;

10 parts by weight of a urethane acrylate obtained by a reaction of 1 mol of tolylene diisocyanate and 2 mol of hydroxyethyl acrylate;

15 parts by weight of tricyclodecane diacrylate;

10 parts by weight of N-vinyl pyrrolidone;

10 parts by weight of isobonyl acrylate;

5 parts by weight of bisphenol-A/ethylene-oxide-added diol diacrylate;

0.7 part by weight of 2-methyl-1-[4-(methylthio)phenyl]-2-morpholino-propane-1-on (Irgacure 907; manufactured by Ciba Speciality Chemicals); and 1.3 parts by weight of 2,4,6-trimethylbenzoyldiphenyl phosphine oxide (Lucirin TPO; manufactured by BASF); and thus coated resin composition was cured upon UV irradiation, whereby a four-core optical fiber ribbon was obtained.

(Preparation of Separable Optical Fiber Ribbon)

Thus obtained two optical fiber ribbons were arranged in parallel, and their outer peripheral face was coated with a UV-curable resin composition B comprising the following constituents:

13 parts by weight of a urethane acrylate obtained by a reaction of 1 mol of bisphenol-A/ethylene-oxide-added diol, 2 mol of tolylene diisocyanate, and 2 mol of hydroxyethyl acrylate;

14 parts by weight of lauryl acrylate;

52 parts by weight of bisphenol A epoxy diacrylate;

17 parts by weight of ethylene-oxide-added nonyl phenol acrylate;

2 parts by weight of 2-methyl-1-[4-(methylthio)phenyl]-2-morpholino-propane-1-on (Irgacure 907; manufactured by Ciba Speciality Chemicals);

2 parts by weight of 2,4,6-trimethylbenzoyldiphenyl phosphine oxide (Lucirin TPO; manufactured by BASF); and 1 part by weight of polysiloxane (having a molecular weight of 37000); and thus coated resin composition was cured upon UV irradiation, whereby a separable optical fiber ribbon was obtained. The urethane group concentration (value of $W \cdot N/100M_W$ in the above-mentioned expression (1)) in the UV-curable resin composition B was $2.5 \times 10^{-4}$ [mol/g].

(Dividability Evaluation Test)

FIGS. 5A to 5D are explanatory views showing respective states in which a separable optical fiber ribbon is divided by using jigs. Namely, vertically movable jigs 301, 301' were moved in their respective directions of arrows shown in FIG. 5A, so as to separate the optical fiber ribbons 6a, 6b from each other, and cases where the optical fiber ribbons 6a, 6b were separated from each other without breaking the collective coating resins 5a, 5b (FIG. 5B) were defined as success, whereas cases where the collective coating resins 5a, 5b were broken so that the colored optical fibers 2d, 2e and the like were exposed (FIG. 5C) or dropped off (FIG. 5D) were defined as failure.

When this test was carried out 50 times for each of the respective separable optical fiber ribbons obtained under the higher and lower line speed conditions, the dividing was success in all of the 50 test operations.

(Measurement of Young's Modulus)

In a nitrogen atmosphere, the UV-curable resin composition B was applied onto a polypropylene sheet and was cured upon irradiation with UV rays having an irradiation light quantity of 100 mJ/cm$^2$, whereby a cured product was obtained with a film thickness of about 50 μm. This cured product was formed into a JIS No. 2 test piece, and its Young's modulus was measured in conformity to the method defined by JIS K 7113 (at a pulling rate of 1 mm/min). As a result, the Young's modulus was 190 MPa at 23° C., and 2150 MPa at –40° C.

(Measurement of Tensile Break Elongation)

In a nitrogen atmosphere, the UV-curable resin composition B was applied onto a polypropylene sheet and was cured upon irradiation with U rays having an irradiation light quantity of 100 mJ/cm$^2$, whereby a cured product was obtained with a film thickness of about 50 μm. This cured product was formed into a JIS No. 2 test piece, and its tensile break elongation was measured in conformity to the method defined by JIS K 7113 (at a pulling rate of 50 mm/min). As a result, the tensile break elongation was 25% at 23° C., and 5% at –40° C.

(Measurement of Adhesion Between Collective Coating Resin and Binding Resin: 180° Peel Test)

In an atmosphere of a mixed gas of nitrogen and oxygen (with an oxygen concentration of 0.5 vol %), the UV-curable resin composition A was applied onto a polypropylene sheet and was cured upon irradiation with UV rays having an irradiation light quantity of 100 mJ/cm$^2$, whereby a cured product 1 was obtained with a film thickness of about 50 μm. Further, in a nitrogen atmosphere, the UV-curable resin composition B was applied onto this cured product and was cured upon irradiation with UV rays having an irradiation light quantity of 100 mJ/cm$^2$, whereby a laminate in which a cured product 2 having a film thickness of about 50 μm was stacked on the cured product 1 was obtained. An end part of the laminate was peeled off, and the adhesion was measured at the time when the cured products were peeled from each other so as to form an angle of 180° therebetween. Thus measured adhesion was 5 N/m.

Example 2

A separable optical fiber ribbon having the configuration shown in FIG. 1 is prepared in the same manner as Example 1 except that a UV-curable resin composition C comprising the following constituents:

20 parts by weight of a urethane acrylate obtained by a reaction of 1 mol of polytetramethylene glycol, 2 mol of tolylene diisocyanate, and 2 mol of hydroxyethyl acrylate;

15 parts by weight of lauryl acrylate;

45 parts by weight of bisphenol A epoxy diacrylate;

15 parts by weight of ethylene-oxide-added nonyl phenol acrylate;

2 parts by weight of 2-methyl-1-[4-(methylthio)phenyl]-2-morpholino-propane-1-on (Irgacure 907; manufactured by Ciba Speciality Chemicals); and 3 parts by weight of 2,4,6-trimethylbenzoyldiphenyl phosphine oxide (Lucirin TPO; manufactured by BASF) is used in place of the UV-curable resin composition B. The urethane group concentration (value of $W \cdot N/100M_W$ in the above-mentioned expression (1)) in the UV-curable resin composition C is $2.5 \times 10^{-4}$ [mol/g].

When the dividability evaluation test is carried out concerning thus obtained separable optical fiber ribbon, results similar to those in Example 1 are obtained.

Also, results of measurement of Young's modulus and tensile break elongation using the UV-curable composition C and the results of 180° peel test using the UV-curable resin compositions A, C are similar to those in Example 1.

Comparative Example 1

A separable optical fiber ribbon was prepared in the same manner as Example 1 except that a UV-curable resin composition D comprising the following constituents:

39 parts by weight of a urethane acrylate obtained by a reaction of 1 mol of polytetramethylene glycol, 2 mol of tolylene diisocyanate, and 2 mol of hydroxyethyl acrylate;

6 parts by weight of a urethane acrylate obtained by a reaction of 1 mol of tolylene diisocyanate and 2 mol of hydroxyethyl acrylate;

30 parts by weight of ethylene-oxide-added trimethylol triacrylate;

16 parts by weight of ethylene-oxide-added nonyl phenol acrylate; and 6 parts by weight of N-vinyl pyrrolidone; and 3 parts by weight of 1-hydroxy cyclohexyl phenyl ketone (Irgacure 184; manufactured by Ciba Speciality Chemicals) was used in place of the UV-curable resin composition B. However, the resin could not sufficiently be cured under the higher line speed condition, thus failing to yield a desirable separable optical fiber ribbon. The urethane group concentration (value of $W \cdot N/100M_W$ in the above-mentioned expression (1)) in the UV-curable resin composition D was $9.0 \times 10^{-4}$ [mol/g].

When the dividability evaluation test was carried out concerning a separable optical fiber ribbon obtained under the lower line speed condition, 42 out of 50 test operations turned out to be success.

Further, the Young's modulus of the cured product of the UV-curable resin composition D was 240 MPa at 23° C., and 880 MPa at −40° C., whereas the tensile break elongation was 30% at 23° C., and 10% at −40° C. The adhesion in the 180° peel test using the UV-curable resin compositions A, D was 10 N/m.

Thus, it was verified that a separable optical fiber ribbon having an excellent dividability can be obtained more reliably in Example 1.

For evaluating the easiness of tearing and removing collective coating resins in optical fiber ribbons of separable optical fiber ribbons, the following tests were carried out in Examples 3 to 6.

Example 3

(Curability Test 1)

In a nitrogen atmosphere, the UV-curable resin composition A was applied to a support and was cured upon irradiation with UV-rays (with an irradiation light quantity of 100 mJ/cm$^2$), so as to prepare a film having a thickness of 100 μm, for which the Young's modulus was measured. Table 1 shows thus obtained result. Table 1 also shows the ratio (500 mJ ratio) to the Young's modulus obtained when cured upon irradiation with UV rays at 500 mJ/cm$^2$, acting as an index of curing rate. It indicates that the curing rate becomes higher as the 500 mJ ratio is greater.

(Curability Test 2)

The film obtained by the curability test 1 was subjected to methyl ethyl ketone extraction for 16 hours at 60° C., and their gel fractions were measured. Table 1 shows thus obtained result. The gel fraction is an index of the amount of uncured components in a resin, and indicates that the amount of uncured components is smaller as the gel fraction is greater. Table 1 also shows the ratio (500 mJ ratio) to the gel fraction obtained when cured upon irradiation with UV rays at 500 mJ/cm$^2$.

(Adhesion Test)

In an air atmosphere, the UV-curable resin composition A was applied to a support and was cured upon irradiation with UV-rays (with an irradiation light quantity of 300 mJ/cm$^2$), so as to prepare two films each having a thickness of 70 μm, a length of 90 mm, and a width of 45 mm. Thus obtained two films were stacked on each other and pressed at 1.5 MPa for 72 hours at 23° C. Then, the adhesion was measured at the time when they were peeled from each other at a pulling rate of 100 mm/min so as to form an angle of 180° therebetween from one end thereof (180° peel test) Table 1 shows thus obtained result.

Example 4

Four-core optical fiber ribbons and a separable optical fiber ribbon were made in the same manner as Example 1 except that a UV-curable resin composition E was prepared with the compounding ratio of 2-methyl-1-[4-(methylthio)phenyl]-2-morpholino-propane-1-on being changed to 1.0 part by weight in the UV-curable resin composition A, and that the collective coating resin was formed by using the UV-curable resin composition E.

Also, for evaluating the easiness of tearing and removing the collective coating resin in the resulting optical fiber ribbons, the curability tests 1 and 2, the adhesiveness test, and a test for evaluating the adhesion between the collective coating resin and the binding resin were carried out in the same manner as Example 3 except that the UV-curable resin composition E was used in place of the UV-curable resin composition A. Table 1 shows thus obtained results.

Example 5

Four-core optical fiber ribbons and a separable optical fiber ribbon were made in the same manner as Example 1 except that a UV-curable resin composition F was prepared with the compounding ratio of 2,4,6-trimethylbenzoyl diphenyl phosphine oxide being changed to 0.5 part by weight in the UV-curable resin composition A, and that the collective coating resin was formed by using the UV-curable resin composition F.

Also, for evaluating the easiness of tearing and removing the collective coating resin in the resulting optical fiber ribbons, the curability tests 1 and 2, the adhesiveness test, and a test for evaluating the adhesion between the collective coating resin and the binding resin were carried out in the same manner as Example 3 except that the UV-curable resin composition F was used in place of the UV-curable resin composition A. Table 1 shows thus obtained results.

Example 6

Four-core optical fiber ribbons and a separable optical fiber ribbon were made in the same manner as Example 1 except that a UV-curable resin composition G was prepared with the compounding ratio of 2,4,6-trimethylbenzoyl diphenyl phosphine oxide being changed to 2.0 parts by weight in the UV-curable resin composition A, and that the collective coating resin was formed by using the UV-curable resin composition G.

Also, for evaluating the easiness of tearing and removing the collective coating resin in the resulting optical fiber ribbons, the curability tests 1 and 2, the adhesiveness test, and a test for evaluating the adhesion between the collective coating resin and the binding resin were carried out in the same manner as Example 3 except that the UV-curable resin composition G was used in place of the UV-curable resin composition A. Table 1 shows thus obtained results.

collective coating resin so as to be integrated into an optical fiber ribbon, and a plurality of said optical fiber ribbons are arranged in parallel and coated with a binding resin; and wherein said binding resin is obtained by curing a UV-curable resin composition satisfying the condition represented by the following expression (1):

$$1.0 \times 10^{-4} \leq (W \cdot N / 100 M_W) \leq 4.0 \times 10^{-4} \quad (1)$$

where W is the compounding ratio [wt %] of a urethane acrylate compound contained in the resin composition, N is the number of urethane groups in one molecule of said urethane acrylate compound, and $M_W$ is the average molecular weight of said urethane acrylate compound.

2. A separable optical fiber ribbon according to claim 1, wherein said binding resin has a tensile break elongation of 25% or less at 23° C.

3. A separable optical fiber ribbon according to claim 1, wherein said binding resin has a tensile break elongation of 5% or less at −40° C.

4. A separable optical fiber ribbon according to claim 1, wherein said collective coating resin is obtained by curing a UV-curable resin composition containing 0.5 to 0.9 wt % of 2-methyl-1-[4-(methylthio)phenyl]-2-morpholino-propane-1-on based on the total composition amount and 1.0 to 1.5

TABLE 1

|  |  | EXAMPLE 3 | EXAMPLE 4 | EXAMPLE 5 | EXAMPLE 6 |
|---|---|---|---|---|---|
| CURABILITY TEST 1 | (YOUNG'S MODULUS) [MPa] | 850 | 780 | 750 | 840 |
|  | (500 mJ RATIO) | 0.95 | 0.91 | 0.89 | 0.93 |
| CURABILITY TEST 2 | (GEL FRACTION) [%] | 97.5 | 96.1 | 96.1 | 97.1 |
|  | (500 mJ RATIO) | 1.00 | 0.99 | 0.98 | 0.99 |
| ADHESION TEST | (ADHESION) [N/m] | 17 | 13 | 15 | 16 |
| ADHESION TEST BETWEEN COLLECTIVE COATING RESIN AND BINDING RESIN | (ADHESION) [N/m] | 5 | 5 | 6 | 5 |

As shown in Table 1, it was verified that the curing rate of the collective coating resin was sufficiently high in Example 3, so that uncured components hardly remained therein. Also, the collective coating resin of the optical fiber ribbons in Example 3 had an appropriate adhesion, so that surfaces of coated tapes did not adhere to each other, and the binding resin could easily be torn in the separable optical fiber ribbon.

INDUSTRIAL APPLICABILITY

As explained in the foregoing, the present invention uses a binding resin obtained by curing a UV-curable resin composition satisfying the condition represented by the above-mentioned expression (1), thereby being able to control the elongation of the binding resin easily and reliably, by which a separable optical fiber ribbon excellent in dividability can be obtained easily and reliably. Further, the separable optical fiber ribbon in accordance with the present invention is one in which the elongation of the binding resin is small even under a low temperature condition, thus being excellent in dividability even under a low temperature condition.

What is claimed is:

1. A separable optical fiber ribbon wherein a plurality of colored optical fibers arranged in parallel are coated with a wt % of 2,4,6-trimethylbenzoyl diphenyl phosphine oxide based on the total composition amount.

5. A method of making a separable optical fiber ribbon including the steps of applying a collective coating resin to a plurality of colored optical fibers arranged in parallel so as to integrate said colored optical fibers into an optical fiber ribbon, and applying a binding resin to a plurality of said optical fiber ribbons arranged in parallel;

wherein said binding resin is obtained by curing a UV-curable resin composition satisfying the condition represented by the following expression (1):

$$1.0 \times 10^{-4} \leq (W \cdot N / 100 M_W) \leq 4.0 \times 10^{-4} \quad (1)$$

where W is the compounding ratio [wt %] of a urethane acrylate compound contained in the resin composition, N is the number of urethane groups in one molecule of said urethane acrylate compound, and $M_W$ is the average molecular weight of said urethane acrylate compound.

6. A method of making a separable optical fiber ribbon according to claim 5, wherein said step of obtaining said optical fiber ribbon includes the steps of arranging a plurality of said colored optical fibers in parallel, transferring said colored optical fibers to coating means and curing means in succession at a predetermined line speed, coating an outer periphery of a plurality of said colored optical fibers with a UV-curable resin composition by said means, and then curing said UV-curable resin composition by said curing means so as to form a collective coating resin; and wherein said UV-curable resin composition contains 0.5 to 0.9 wt % of 2-methyl-1-[4-(methylthio)phenyl]-2-morpholino-propane-1-on based on the total composition amount and 1.0 to 1.5 wt % of 2,4,6-trimethylbenzoyl diphenyl phosphine oxide based on the total composition amount.

7. A method of making a separable optical fiber ribbon according to claim 6, wherein said line speed is at least 800 m/min.

* * * * *